US012216489B2

(12) United States Patent
Wasko et al.

(10) Patent No.: US 12,216,489 B2
(45) Date of Patent: Feb. 4, 2025

(54) CLOCK ADJUSTMENT HOLDOVER

(71) Applicant: MELLANOX TECHNOLOGIES, LTD., Yokneam (IL)

(72) Inventors: Wojciech Wasko, Mlynek (PL); Dotan David Levi, Kiryat Motzkin (IL); Natan Manevich, Ramat HaSharon (IL); Maciek Machnikowski, Reda (PL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/111,916

(22) Filed: Feb. 21, 2023

(65) Prior Publication Data

US 2024/0281022 A1 Aug. 22, 2024

(51) Int. Cl.
*G06F 1/12* (2006.01)
*G06F 1/08* (2006.01)
*G06F 1/14* (2006.01)

(52) U.S. Cl.
CPC .................. *G06F 1/12* (2013.01); *G06F 1/08* (2013.01); *G06F 1/14* (2013.01)

(58) Field of Classification Search
CPC ...................................... G06F 1/12; G06F 1/08
USPC ........................................................ 713/400
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |

(Continued)

FOREIGN PATENT DOCUMENTS

| | | |
|---|---|---|
| CN | 101059825 A | 10/2007 |
| CN | 101388741 A | 3/2009 |

(Continued)

OTHER PUBLICATIONS

U.S. Appl. No. 17/549,949 Office Action dated Mar. 30, 2023.

(Continued)

*Primary Examiner* — Volvick Derose
(74) *Attorney, Agent, or Firm* — Meitar Patents Ltd.; Daniel Kligler

(57) ABSTRACT

In one embodiment, a clock synchronization system includes clock circuitry to maintain a clock running at a clock frequency, a clock controller, and a processor to execute software to generate clock update commands and provide the clock update commands to the clock controller, wherein the clock controller is configured to apply the clock update commands to the clock, store a holdover frequency command to maintain the clock during a failure of the clock update commands, apply the holdover frequency command to the clock responsively to detecting the failure.

22 Claims, 6 Drawing Sheets

(56) References Cited

U.S. PATENT DOCUMENTS

| | | | |
|---|---|---|---|
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,148,274 B1* | 12/2018 | Jin | H03L 7/18 |
| 10,164,759 B1 | 12/2018 | Volpe |
| 10,320,646 B2 | 6/2019 | Mirsky et al. |
| 10,483,987 B1* | 11/2019 | Ranganathan | H03L 7/1972 |
| 10,515,045 B1 | 12/2019 | Mattina |
| 10,608,647 B1* | 3/2020 | Ranganathan | H03L 7/085 |
| 10,637,776 B2 | 4/2020 | Iwasaki |
| 10,727,844 B1* | 7/2020 | Gong | H03L 7/087 |
| 10,727,966 B1 | 7/2020 | Izenberg et al. |
| 10,778,361 B1 | 9/2020 | Almog et al. |
| 10,778,406 B2 | 9/2020 | Gaist et al. |
| 10,841,243 B2 | 11/2020 | Levi et al. |
| 10,879,910 B1 | 12/2020 | Franck et al. |
| 10,887,077 B1 | 1/2021 | Ivry |
| 10,908,635 B1* | 2/2021 | Ranganathan | H03L 7/22 |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Evi et al. |
| 11,476,928 B2 | 10/2022 | Levi et al. |
| 11,606,157 B1 | 3/2023 | Wasko et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2006/0171496 A1* | 8/2006 | Nakamuta | H03L 7/0991 |
| | | | 375/376 |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0167443 A1* | 7/2009 | Liu | H03L 7/099 |
| | | | 331/10 |
| 2009/0257458 A1 | 10/2009 | Cui et al. |
| 2010/0280858 A1 | 11/2010 | Bugenhagen |
| 2011/0110360 A1 | 5/2011 | Fenwick et al. |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1* | 2/2013 | Bedrosian | H04J 3/0667 |
| | | | 370/350 |
| 2013/0045014 A1 | 2/2013 | Mottahedin et al. |
| 2013/0215889 A1 | 8/2013 | Zheng et al. |
| 2013/0235889 A1* | 9/2013 | Aweya | H03L 7/089 |
| | | | 370/516 |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0003199 A1* | 1/2014 | Dougan | H04J 3/0641 |
| | | | 368/46 |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1* | 7/2017 | Rivaud | H04B 15/06 |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |

(56) References Cited

U.S. PATENT DOCUMENTS

| | | |
|---|---|---|
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2019/0384351 A1* | 12/2019 | J .......................... H03L 7/093 |
| 2020/0044657 A1* | 2/2020 | Pi ......................... H03L 7/0992 |
| 2020/0162234 A1 | 5/2020 | Almog et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0006344 A1* | 1/2021 | Chen ..................... G01S 19/14 |
| 2021/0141413 A1 | 5/2021 | Levi et al. |
| 2021/0175991 A1* | 6/2021 | Neugeboren ......... H04J 3/0667 |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0121691 A1 | 7/2022 | Mentovich et al. |
| 2022/0224500 A1 | 7/2022 | Mula et al. |
| 2022/0239549 A1 | 7/2022 | Zhao et al. |
| 2022/0261032 A1* | 8/2022 | Bateni ..................... G06F 1/12 |
| 2022/0342086 A1 | 10/2022 | Yoshida |
| 2022/0352998 A1 | 11/2022 | Levi et al. |
| 2022/0357763 A1 | 11/2022 | Levy et al. |
| 2022/0360423 A1 | 11/2022 | Levi et al. |
| 2022/0385598 A1 | 12/2022 | Pismenny et al. |
| 2022/0416925 A1 | 12/2022 | Levi et al. |
| 2023/0076889 A1* | 3/2023 | Rabinovich ........... H04J 3/0682 |

FOREIGN PATENT DOCUMENTS

| | | |
|---|---|---|
| CN | 106817183 A | 6/2017 |
| CN | 108667547 A | 10/2018 |
| CN | 108829493 A | 11/2018 |
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
Zhang et al., "Ti BAW technology enables ultra-low jitter clocks for highspeed networks", White paper, Texas Instruments, pp. 1-11, Feb. 2019.
Skywork Solutions Inc., "PCI Express 3.1 Jitter Requirements", AN562, pp. 1-16, year 2021.
Intel, "Can Altera GX/GT/GZ device high speed transceivers handle Spread Spectrum Clocking (SSC), as required by PCIe or SATA/SAS protocols?", p. 1, Sep. 11, 2012.
U.S. Appl. No. 17/670,540 Office Action dated Jan. 18, 2023.
Levi et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
U.S. Appl. No. 17/579,630 Office Action dated Jan. 12, 2023.
Manevich et al., U.S. Appl. No. 17/885,604, filed Aug. 11, 2022.
U.S. Appl. No. 17/191,736 Advisory Action dated Feb. 16, 2023.
Manevich et al., U.S. Appl. No. 18/067,767, filed Dec. 19, 2022.
"IEEE Standard for Local and Metropolitan Area Networks—Timing and Synchronization for Time-Sensitive Applications," IEEE Std 802.1AS-2020, IEEE Computer Society, pp. 1-421, year 2020.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377-60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/313,026 Office Action dated Dec. 19, 2023.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
IPClock, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
Levi et al., U.S. Appl. No. 17/868,841, filed Jul. 20, 2022.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

(56) References Cited

OTHER PUBLICATIONS

ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
Manevich et al., U.S. Appl. No. 17/579,630, filed Jan. 20, 2022.
Levi et al., U.S. Appl. No. 17/871,937, filed Jul. 24, 2022.
Manevich et al., U.S. Appl. No. 17/867,779, filed Jul. 19, 2022.
ITU-T Recommendation, "G.8262.1/Y.1362.1—Series G: Transmission Systems and Media, Digital Systems and Networks—Packet over Transport Aspects—Synchronization, Quality and Availability Targets Series Y: Global Information Infrastructure, Internet Protocol Aspects, Next-Generation Networks, Internet of Things and Smart Cities—Timing Characteristics of Enhanced Synchronous Equipment Slave Clock," pp. 1-26, Jan. 2019.
Silicon Laboratories Inc., "Temperature-Compensated Oscillator Example," AN365, Rev. 0.1, pp. 1-8, Nov. 9, 2009.
Sutton et al., "Reinforcement Learning," Chapter 6.6—"Actor-Critic Methods," The MIT Press, e-book, pp. 1-3, Jan. 4, 2005, as downloaded from incompleteideas.net/book/first/ebook/node66.html.
CN Application # 202210456108.6 Office Action dated Aug. 30, 2024.

\* cited by examiner

CLOCK ADJUSTMENT HOLDOVER

FIELD OF THE INVENTION

The present invention relates to computer systems, and in particular, but not exclusively, to clock frequency adjustment.

BACKGROUND

In some systems, a local clock running on a network interface controller (NIC) may be adjusted based on frequency updates provided by a software application running on a processor, for example, in a host device.

The software managing the clock (sometimes referred to as "servo") disciplines the clock by measuring the clock's error against some clock synchronization leader and issues adjustment commands to correct the clock errors. The software generally simultaneously corrects for different types of errors including: (a) long-term errors (which are typically measured over time periods of days), for example, oscillator aging, (b) medium-term errors (typically measured over time periods of minutes), for example, ambient/oscillator temperature changes, (c) short-term errors (typically measured over time periods of milliseconds), for example, oscillator frequency instabilities, jitter due to hardware limitations (e.g., clock quantization and inaccuracies).

SUMMARY

There is provided in accordance with an embodiment of the present disclosure, a clock synchronization system, including clock circuitry to maintain a clock running at a clock frequency, a clock controller, and a processor to execute software to generate clock update commands and provide the clock update commands to the clock controller, wherein the clock controller is configured to apply the clock update commands to the clock, store a holdover frequency command to maintain the clock during a failure of the clock update commands, and apply the holdover frequency command to the clock responsively to detecting the failure.

Further in accordance with an embodiment of the present disclosure the software is configured to generate the holdover frequency command, and provide the holdover frequency command to the clock controller.

Still further in accordance with an embodiment of the present disclosure the clock controller is configured to generate the holdover frequency command.

Additionally in accordance with an embodiment of the present disclosure the clock controller is configured to apply the holdover frequency command to the clock in the absence of the clock controller receiving any clock update command within a time period derived from timing criteria.

Moreover, in accordance with an embodiment of the present disclosure the software is configured to generate the timing criteria, which indicates when the controller applies the holdover frequency command, and provide the timing criteria to the clock controller.

Further in accordance with an embodiment of the present disclosure the software is configured to provide a message including the holdover frequency command and the timing criteria to the clock controller.

Still further in accordance with an embodiment of the present disclosure the timing criteria specifies a deadline of the time period.

Additionally in accordance with an embodiment of the present disclosure the timing criteria defines the deadline as any of the following a given time value, a time relative to when the timing criteria was received by the clock controller, a time relative to when the clock controller applied a given previous frequency adjustment, or a time relative to when the clock controller applied a latest frequency adjustment.

Moreover, in accordance with an embodiment of the present disclosure the software is configured to generate the holdover frequency command responsively to clock updates.

Further in accordance with an embodiment of the present disclosure the software is configured to generate the holdover frequency command responsively to any one or more of the following an average of clock updates, a mean of clock updates, a median of clock updates, and a mode of clock updates.

Still further in accordance with an embodiment of the present disclosure the clock controller is configured to generate the holdover frequency command responsively to clock updates.

Additionally in accordance with an embodiment of the present disclosure the clock controller is configured to generate the holdover frequency command responsively to any one or more of the following an average of clock updates, a mean of clock updates, a median of clock updates, and a mode of clock updates.

Moreover in accordance with an embodiment of the present disclosure the software is configured to provide a message to the clock controller to cancel the holdover frequency command.

Further in accordance with an embodiment of the present disclosure the software is configured to provide another holdover frequency command to the clock controller to override the previously provided holdover frequency command.

Still further in accordance with an embodiment of the present disclosure the clock controller is included in a processor configured to execute driver software, which is configured responsively to detecting the failure to apply the holdover frequency command to the clock.

Additionally in accordance with an embodiment of the present disclosure the clock controller includes an application specific integrated circuit, which is configured responsively to detecting the failure to apply the holdover frequency command to the clock.

Moreover, in accordance with an embodiment of the present disclosure the clock circuitry maintains the clock for at least one of a network interface controller, a data processing unit (DPU), a central processing unit (CPU), or a graphics processing unit (GPU).

There is also provided in accordance with another embodiment of the present disclosure, a clock synchronization method, including maintaining a clock running at a clock frequency, generating clock update commands, applying by a clock controller the clock update commands to the clock, storing a holdover frequency command to maintain the clock during a failure of the clock update commands, and applying by the clock controller the holdover frequency command to the clock responsively to detecting the failure.

Further in accordance with an embodiment of the present disclosure, the method includes generating the holdover frequency command.

Still further in accordance with an embodiment of the present disclosure the applying includes applying the holdover frequency command to the clock in the absence of the clock controller receiving any clock update command within a time period derived from timing criteria.

Additionally in accordance with an embodiment of the present disclosure, the method includes generating the timing criteria, which indicates when the clock controller applies the holdover frequency command, and providing the timing criteria to the clock controller.

Moreover, in accordance with an embodiment of the present disclosure, the method includes providing a message including the holdover frequency command and the timing criteria to the clock controller.

Further in accordance with an embodiment of the present disclosure the timing criteria specifies a deadline of the time period.

Still further in accordance with an embodiment of the present disclosure the timing criteria defines the deadline as any of the following a given time value, a time relative to when the timing criteria was received by the clock controller, a time relative to when the clock controller applied a given previous frequency adjustment, or a time relative to when the clock controller applied a latest frequency adjustment.

Additionally in accordance with an embodiment of the present disclosure the generating the holdover frequency command includes generating the holdover frequency command responsively to frequency updates.

Moreover, in accordance with an embodiment of the present disclosure the generating the holdover frequency command includes generating the holdover frequency command responsively to any one or more of the following an average of frequency updates, a mean of frequency updates, a median of frequency updates, and a mode of frequency updates.

Further in accordance with an embodiment of the present disclosure, the method includes providing a message to the clock controller to cancel the holdover frequency command.

Still further in accordance with an embodiment of the present disclosure, the method includes providing another holdover frequency command to the clock controller to override the previously provided holdover frequency command.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
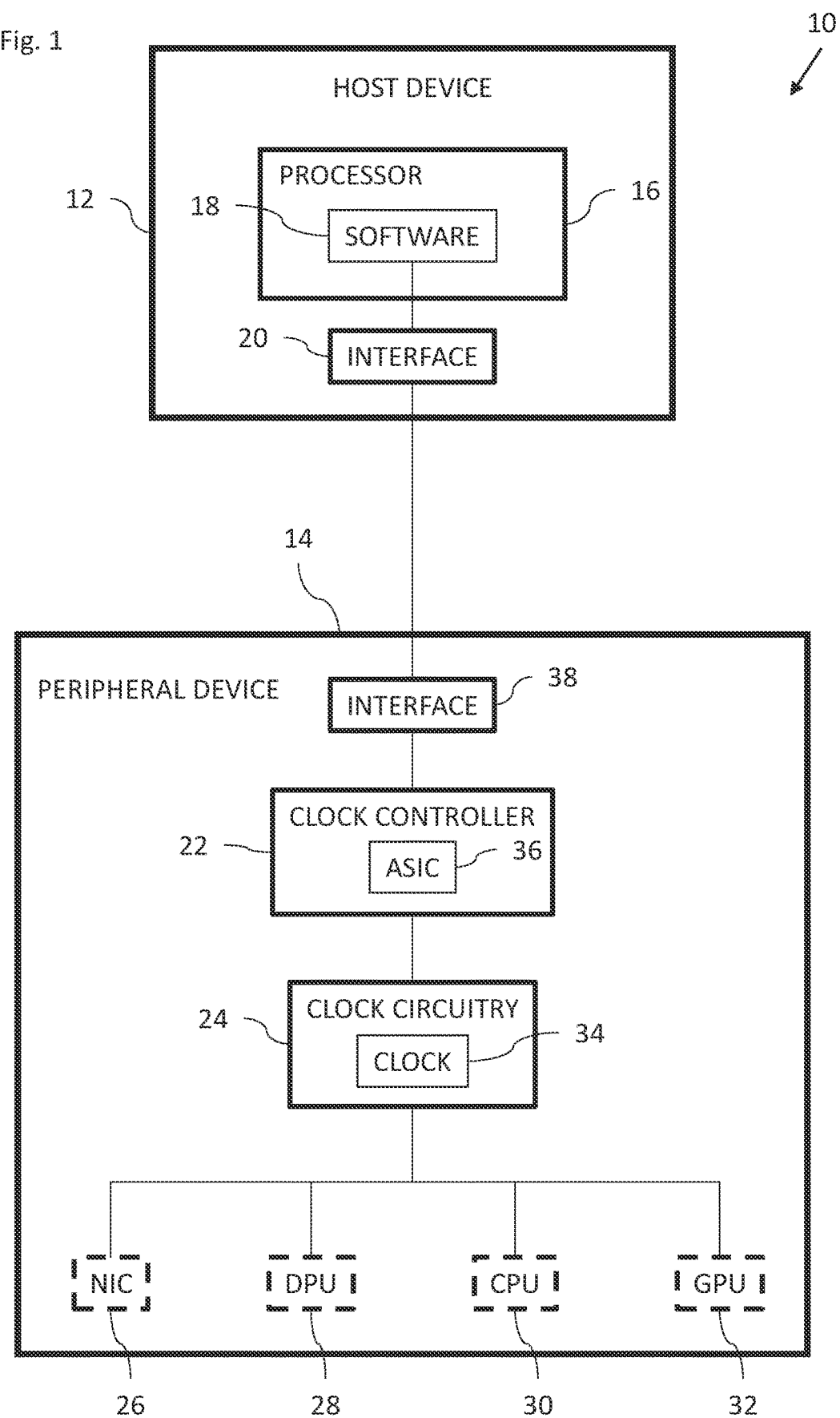
FIG. 1 is a block diagram view of a clock synchronization system constructed and operative in accordance with an embodiment of the present invention.

As previously mentioned, a local clock running on a device (such as peripheral device (e.g., a network interface controller (NIC)), or a device including a graphics processing unit (GPU), data processing unit (DPU), or central processing unit (CPU)), may be adjusted based on frequency updates provided by a software application running on a processor, for example, in a host device. The software managing the clock (sometimes referred to as "servo") disciplines the clock by measuring the clock's error against some clock synchronization leader and issues adjustment commands to correct the clock errors.

A clock is described as being in state of "holdover" if it is no longer being disciplined according to measurements of the clock's error against some reference (e.g., a clock synchronization leader). Holdover may be a result of some failure to receive clock updates such as connectivity loss, failure of the reference, or failure of software managing the clock. The corrections applied to the clock by the software are persistent even if the software no longer controls the clock, such as when the software crashes. This means that if the software crashes or there is some other failure, the clock will be "dead reckoning" with the last adjustment the clock received from the software and the clock accuracy in the state of holdover is entirely decided by the last adjustment. This is not generally a satisfactory solution as the previous software correction corrects for short-term, medium-term, and long-term errors. Additionally, using the last adjustment in the long term generally leads to a large clock drift.

Using the last adjustment while the software has failed (or some other failure) may be problematic in at least two cases in particular: (1) if a clock control loop uses frequency adjustments to compensate for time error leading to relatively high-amplitude frequency adjustments in regular operation; and (2) the clock control loop is currently responding to a transient timing error (e.g., due to network congestion or network reconfiguration).

Therefore, in embodiments of the present invention, clock management software is programmed to provide a clock controller with a holdover frequency command to be used in the future by the clock controller to maintain the clock when there is a failure to receive clock updates (e.g., when the software crashes or is killed or does not provide clock updates commands on a regular basis for any reason). In some embodiments, the clock controller generates the holdover frequency command.

While the software is active and is still sending clock update commands to the clock controller, the clock controller maintains the clock and applies the clock update commands to the clock. The clock update commands may be frequency update commands (i.e., to update a frequency of the clock) or clock value update commands (i.e., to update the value of the clock). The clock may be updated by updating a frequency of the clock and/or updating the clock value, e.g., by stepping the clock value from one value to another value such as moving the clock by 10 nanoseconds forward or backward. However, when the software fails or similar failure occurs and the clock controller no longer receives clock update commands (e.g., within a timeout), the clock controller maintains and updates the clock (e.g., by updating the clock frequency and/or the clock value) based on the previously provided holdover frequency command.

The holdover frequency command may be generated to maintain the clock over the medium to long term. In some embodiments, the holdover frequency command may be computed based on two or more (e.g., 1000) (previous) frequency updates applied to the clock.

In some embodiments, the clock controller may determine that a failure has occurred based on the absence of the clock controller receiving any clock update commands within a time period derived from timing criteria (e.g., previously provided by the software). The timing criteria may specify a deadline of the time period over which absence of receiving any clock update command is determined. The time period may have any suitable duration for example in the order of microseconds to minutes. The timing criteria may define the deadline as any of the following: a given time value, a time relative to when the timing criteria was received by the clock controller, a time relative to when the clock controller applied a given previous frequency adjustment, or a time relative to when the clock controller applied a latest frequency adjustment.

In some embodiments, the software or the clock controller may generate the holdover frequency command based on one or more of the following: an average of (previous) frequency updates, a mean of (previous) frequency updates, a median of (previous) frequency updates, a mode of (previous) frequency updates.

The software may provide a message to the clock controller to cancel the holdover frequency command. The software may provide another holdover frequency command to the clock controller thereby overriding a previously provided holdover frequency command.

In some embodiments, the clock controller may be implemented using driver software which is executed by a processor in the host device. The driver detects the failure of the software and applies the holdover frequency command to the clock frequency. In other embodiments, the clock controller may include an application specific integrated circuit (ASIC), which responsively to detecting the failure of the software applies the holdover frequency command to the clock frequency.

System Description

Reference is now made to FIG. 1, which is a block diagram view of a clock synchronization system 10 constructed and operative in accordance with an embodiment of the present invention. The system 10 comprises a host device 12 and a peripheral device 14 connected to each other via a suitable interface, for example, a peripheral data bus interface, such as Peripheral Component Interconnect Express (PCIe). In some embodiments, the host device 12 and the peripheral device 14 may be combined into a single processing device. In other embodiments, the host device 12 and/or peripheral device 14 may be any suitable processing devices connected via a suitable data connection.

The host device 12 includes: a processor 16 configured to execute software 18; and an interface 20 configured to share data with the peripheral device 14. The software 18 is described in more detail with reference to FIGS. 2-7.

The peripheral device 14 includes: an interface 38 configured to share data with the host device 12; a clock controller 22; clock circuitry 24; and one or more of the following: a network interface controller (NIC) 26; a data processing unit (DPU) 28; a central processing unit (CPU) 30; and/or a graphics processing unit (GPU) 32. In some embodiments, the central processing unit 30 and the processor 16 may be the same element.

The clock controller 22 includes an application specific integrated circuit (ASIC) 36. The functionality of the application specific integrated circuit 36 is described in more detail with reference to FIGS. 3 and 5. The clock controller 22 is described in more detail with reference to FIGS. 2-7. In some embodiments, the clock controller 22 is implemented by a driver run by the processor 16 of the host device 12, described in more detail with reference to FIG. 7.

The clock circuitry 24 is configured to maintain a clock 34 running at a clock frequency. The clock circuitry 24 may include a hardware clock (e.g., Precision Time Protocol (PTP) hardware clock) which maintains a clock time (e.g., Coordinated Universal Time or UTC) and runs at the clock frequency. In some embodiments, the clock circuitry 24 may include a free running counter and the time of the clock is obtained by applying some computation to the value of the counter. The clock 34 may be adjusted by adjusting the frequency of the running hardware clock or counter, or by adjusting a time value of the clock or a value of the counter, or by applying an adjustment to the computation used to compute the clock time from the value of the counter. In some embodiments, the clock circuitry 24 is configured to maintain the clock 34 for one or more of: the network interface controller 26; the data processing unit 28; the central processing unit 30; and/or the graphics processing unit 32.

Figure 2:
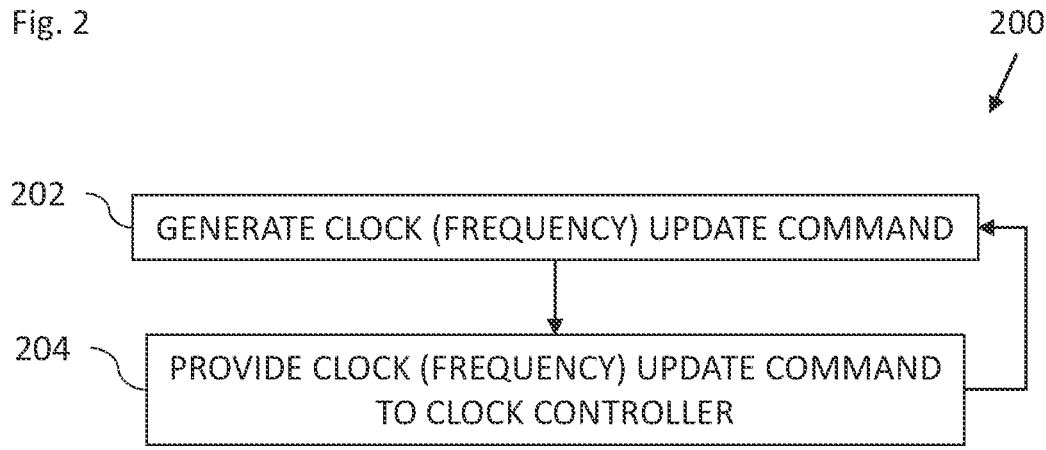
FIG. 2 is a flowchart including steps in a clock synchronization method for use in the system of FIG. 1.

Reference is now made to FIG. 2, which is a flowchart 200 including steps in a clock synchronization method for use in the system 10 of FIG. 1. The software 18 is configured to generate clock update commands and provide the clock update commands to the clock controller 22 to apply the clock update commands to the clock maintained by the clock circuitry 24. The clock update commands may be frequency update commands (i.e., to update a frequency of the clock) or clock value update commands (i.e., to update the value of the clock). The clock may be updated by updating a frequency of the clock and/or updating the clock value, e.g., by stepping the clock value from one value to another value. A frequency update command may be used to update a frequency of the clock or to update the clock value by stepping the clock intermittently according to the frequency update command. A clock update command may be used to update the clock value by changing the clock value or by changing the clock frequency which leads to changing the clock value over time.

In more detail, the software 18 is configured to generate a clock (frequency) update command (block 202), and provide the generated clock (frequency) update command to the clock controller 22 (block 204) to apply the clock (frequency) update command to the clock and/or clock frequency. The steps of blocks 202 and 204 are repeated intermittently, for example, every millisecond or second etc. The above process is used to correct the frequency and/or value of the clock 34 on a regular basis based on time synchronization with a remote clock (not shown).

Figure 3:
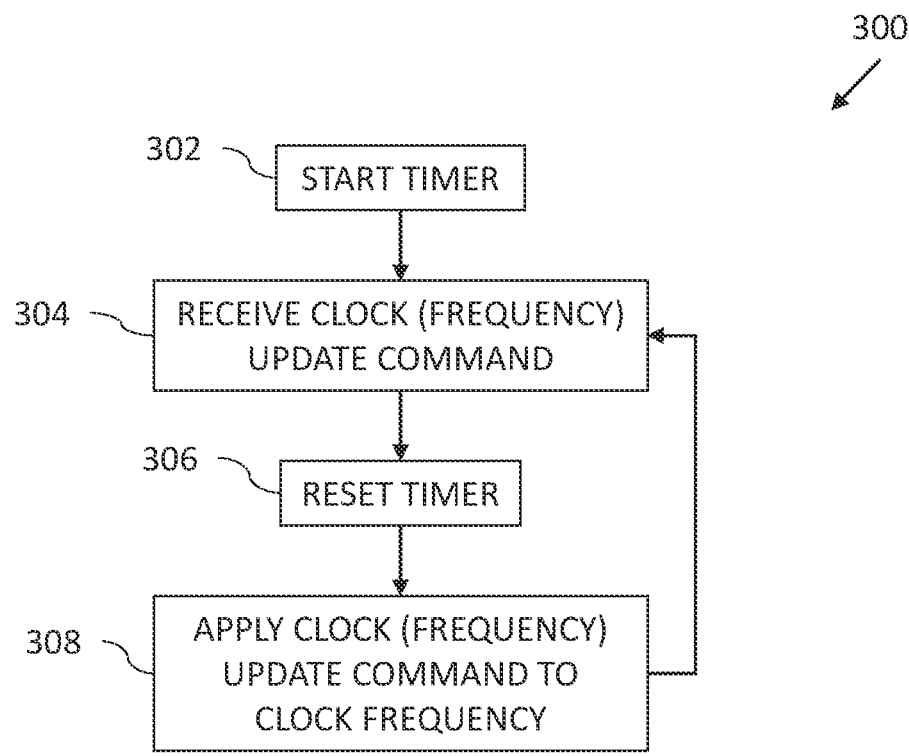
FIGS. 3-5 are flowcharts including steps in a method of holdover frequency management for use in the system of FIG. 1.
Figure 4:
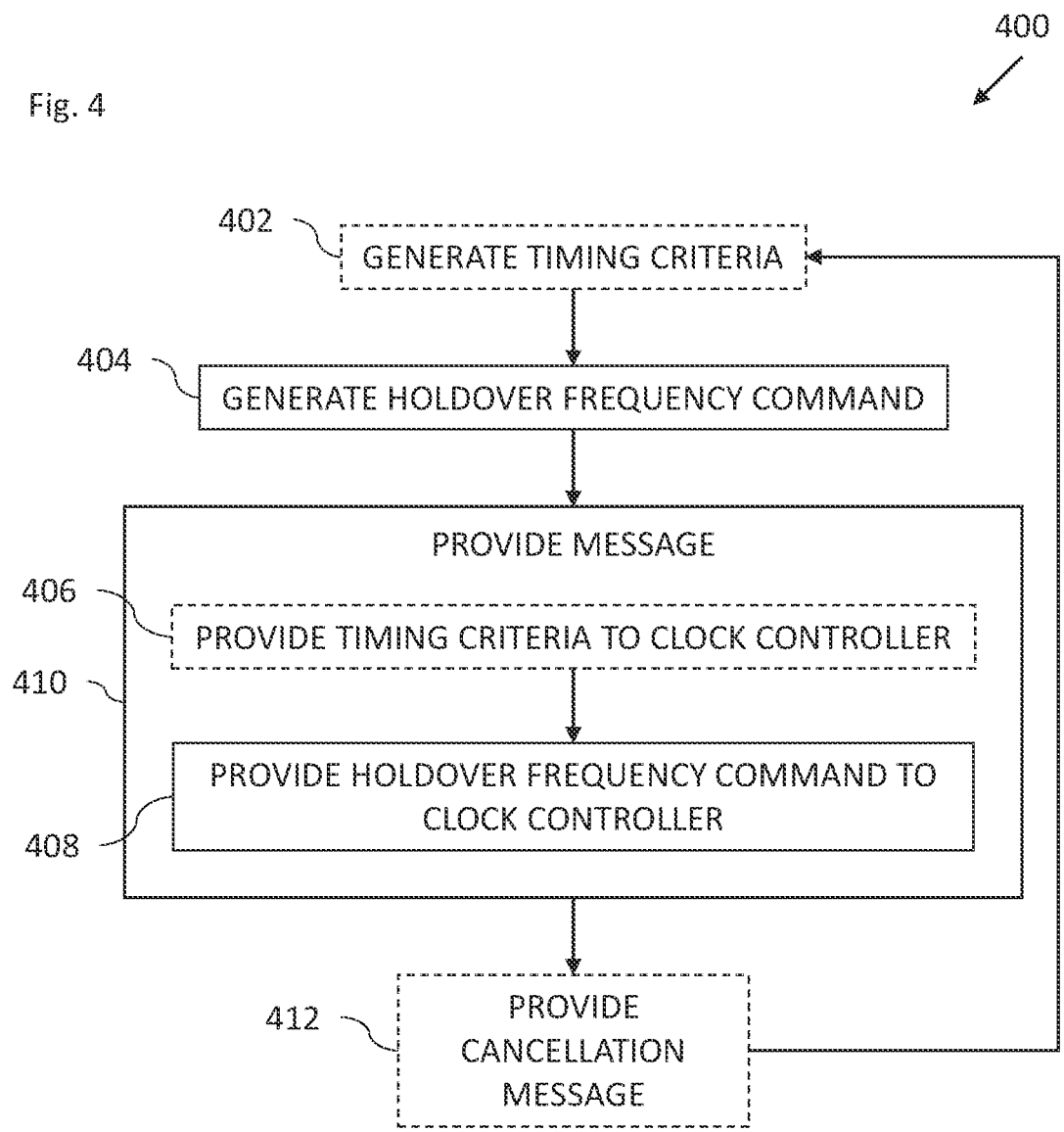
Figure 5:
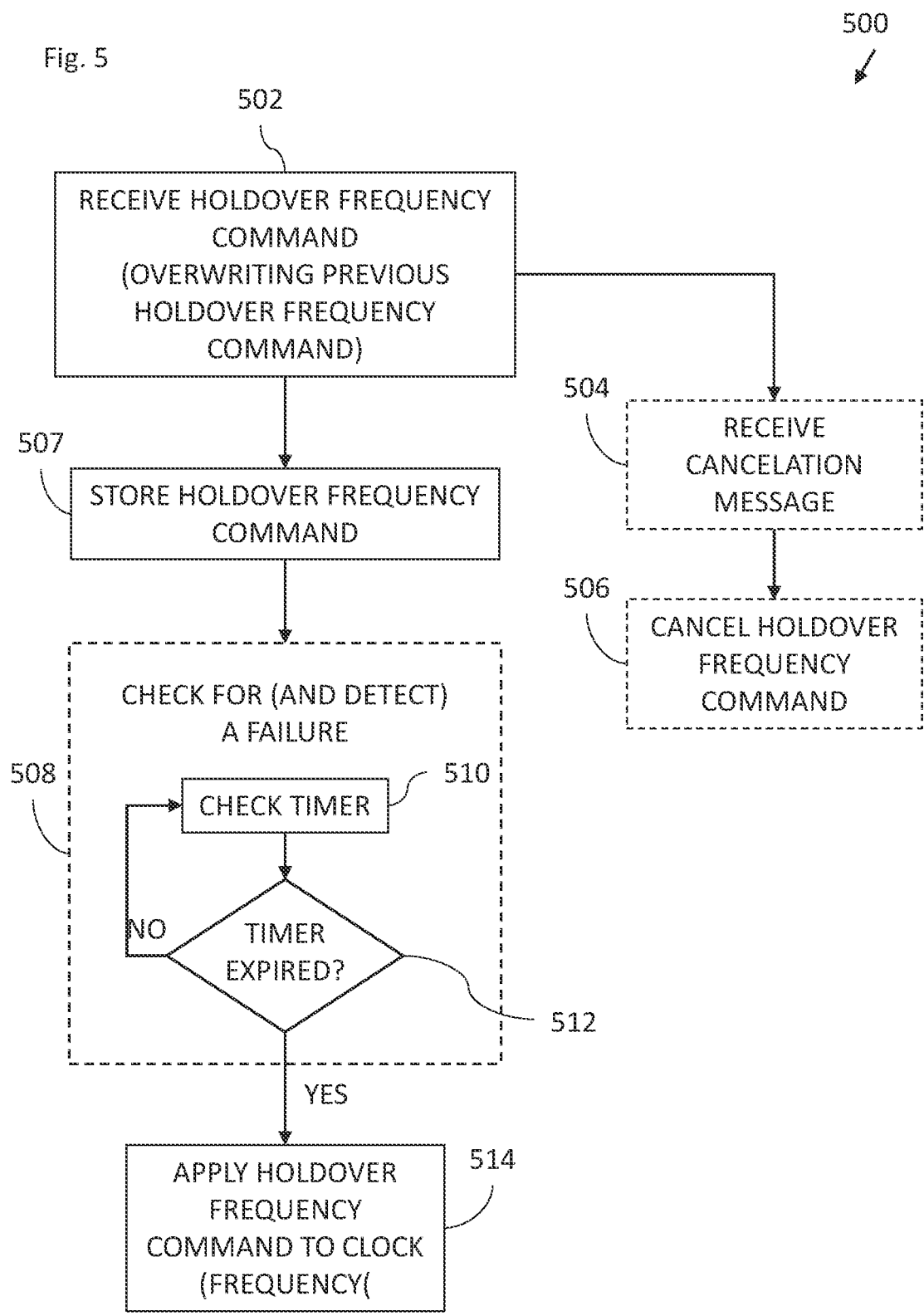

FIGS. 3-5 are flowcharts including steps in a method of holdover frequency management for use in the system 10 of FIG. 1. Reference is now made to FIG. 3, which is a flowchart 300 in a method performed by the application specific integrated circuit 36 of the clock controller 22. The application specific integrated circuit 36 of the clock controller 22 is configured to start a timer (block 302), which is used to determine if the software 18 has failed or if there is another failure of receiving clock (frequency) update commands (e.g., due to leader failure or connection failure), as will be described in more detail with reference to FIG. 5. Using a timer is one way to determine if the software has failed or if there is another failure of receiving clock (frequency) update commands. Other methods may also be applied to determine if the software has failed or if there is another failure of receiving clock (frequency) update commands. The application specific integrated circuit 36 of the clock controller 22 is configured to receive a clock (frequency) update command from the software 18 (block 304). The application specific integrated circuit 36 of the clock controller 22 is configured to reset the timer, upon receiving the clock (frequency) update command (block 306) and the timer then continues to run from its reset value (e.g., zero). The application specific integrated circuit 36 of the clock controller 22 is configured to apply the received clock (frequency) update command to the value of the clock 34 and/or clock frequency of the clock 34 (block 308). The steps of blocks 304-308 are repeated upon receiving a new clock (frequency) update command.

Reference is now made to FIG. 4, which is a flowchart 400 in a method performed by the software 18 to generate and provide a holdover frequency command to the clock controller 22. In some embodiments, the software 18 is configured to generate timing criteria, which indicates when the clock controller 22 applies the holdover frequency command to the value of the clock and/or frequency of the clock (block 402). The timing criteria is provided to the clock controller 22 as described in more detail below. The timing criteria generally specifies a deadline (or a length) of a time period after which the clock controller 22 applies the holdover frequency command to the clock value and/or frequency in the absence of receiving a clock (frequency) update command during the time period. The time period and/or the deadline may be tracked using the timer (which is reset when a clock (frequency) update command is received) described with reference to FIG. 3 or a timer which is managed according to any suitable method depending on the timing criteria. The timing criteria may define the deadline as any of the following: a given time value; a time relative to when the timing criteria was received by the clock controller 22; a time relative to when the clock controller 22 applied a given previous frequency adjustment; or a time relative to when the clock controller 22 applied a latest frequency adjustment.

The software 18 is configured to generate the holdover frequency command to maintain the clock frequency during a failure of the software 18 or other failure to receive clock (frequency) update commands (as described above) for future use by the clock controller 22 (block 404) The software 18 may be configured to generate the holdover frequency command responsively to two or more previously applied or computed clock (frequency) updates to the frequency of the clock 34. For example, the holdover frequency command may be computed using any suitable function from the X previous frequency updates, where X may have any suitable value, such as 2, 5, 1,000, 10,000, etc. By way of another example, the holdover frequency command may be computed by summing the amount of nanoseconds the clock was stepped over a certain period of time and divided by the duration of that period.

The software 18 is configured to generate the holdover frequency command responsively to one or more of the following: an average of frequency updates; a mean of frequency updates; a median of frequency updates; and/or a mode of frequency updates.

In other embodiments, the holdover frequency command and/or the timing criteria may be generated by the clock controller 22 instead of by the software 18 according to the methods described above. The clock controller 22 may be manufactured or otherwise configured to generate the holdover frequency command and/or the timing criteria. Alternatively, the software 18 may signal the clock controller 22 to generate the holdover frequency command and/or the timing criteria.

In some embodiments, the software 18 is configured to provide the timing criteria to the clock controller 22 (block 406). The software 18 is configured to provide the holdover frequency command to the clock controller 22 (block 408). In some embodiments, the steps of blocks 406-408 may be performed by the software 18 being configured to provide a message including the holdover frequency command and the timing criteria to the clock controller 22 (block 410).

The software 18 may be configured to provide a message to the clock controller 22 to cancel the provided holdover frequency command (block 412). The software 18 may be configured to intermittently perform the steps of blocks 402-412 again with a new holdover frequency command and optionally new timing criteria. Therefore, the software 18 may be configured to provide another holdover frequency command to the clock controller 22 to override the previously provided holdover frequency command.

Reference is now made to FIG. 5, which is a flowchart 500 including steps in a method in which the clock controller 22 applies the provided holdover frequency command to the clock value and/or frequency of the clock 34.

The application specific integrated circuit 36 of the clock controller 22 is configured to receive the holdover frequency command from the software 18 (block 502) (optionally overwriting a previous holdover frequency command). In some embodiments, the application specific integrated circuit 36 of the clock controller 22 is configured to receive a cancellation message canceling the provided holdover frequency command (block 504) and cancel the holdover frequency command (block 506), which may include deleting the provided holdover frequency command (from memory) or preventing use of the provided holdover frequency command. In other embodiments, the application specific integrated circuit 36 is configured to generate the holdover frequency command.

The application specific integrated circuit 36 of the clock controller 22 is configured to store the holdover frequency command for future use (block 507).

Assuming the holdover frequency command has not cancelled, the application specific integrated circuit 36 of the clock controller 22 is configured to apply the holdover frequency command to the clock frequency responsively to detecting the failure of the software 18 or other failure to receive the clock (frequency) update commands, as described in more detail below.

The application specific integrated circuit 36 is configured to detecting failure of the software 18 or other failure to receive the clock (frequency) update commands (block 508). The step of block 508 may include the application specific integrated circuit 36 being configured to check a value of the timer (block 510) and at decision block 512 determine if the value of the timer fulfills the timing criteria, for example, determine if the value of the timer has exceeded a given time value thereby indicating that the time period over which a clock (frequency) update command should have been received by the clock controller 22 has expired without receipt of any clock (frequency) update command by the clock controller 22.

If the value of the timer does not fulfill the criteria (e.g., the timer has not expired) the step of block 510 is repeated. If the value of the timer does fulfill the criteria (e.g., the timer has expired) the application specific integrated circuit 36 of the clock controller 22 is configured to apply the holdover frequency command to the clock value and/or frequency to maintain the clock 34 (block 514) until further clock (frequency) update commands are received by the clock controller 22 from the software 18. Therefore, in some embodiments, the clock controller 22 is configured to apply the holdover frequency command to the clock value and/or frequency in the absence of the clock controller 22 receiving any clock (frequency) update command within the time period derived from timing criteria.

Figure 6:
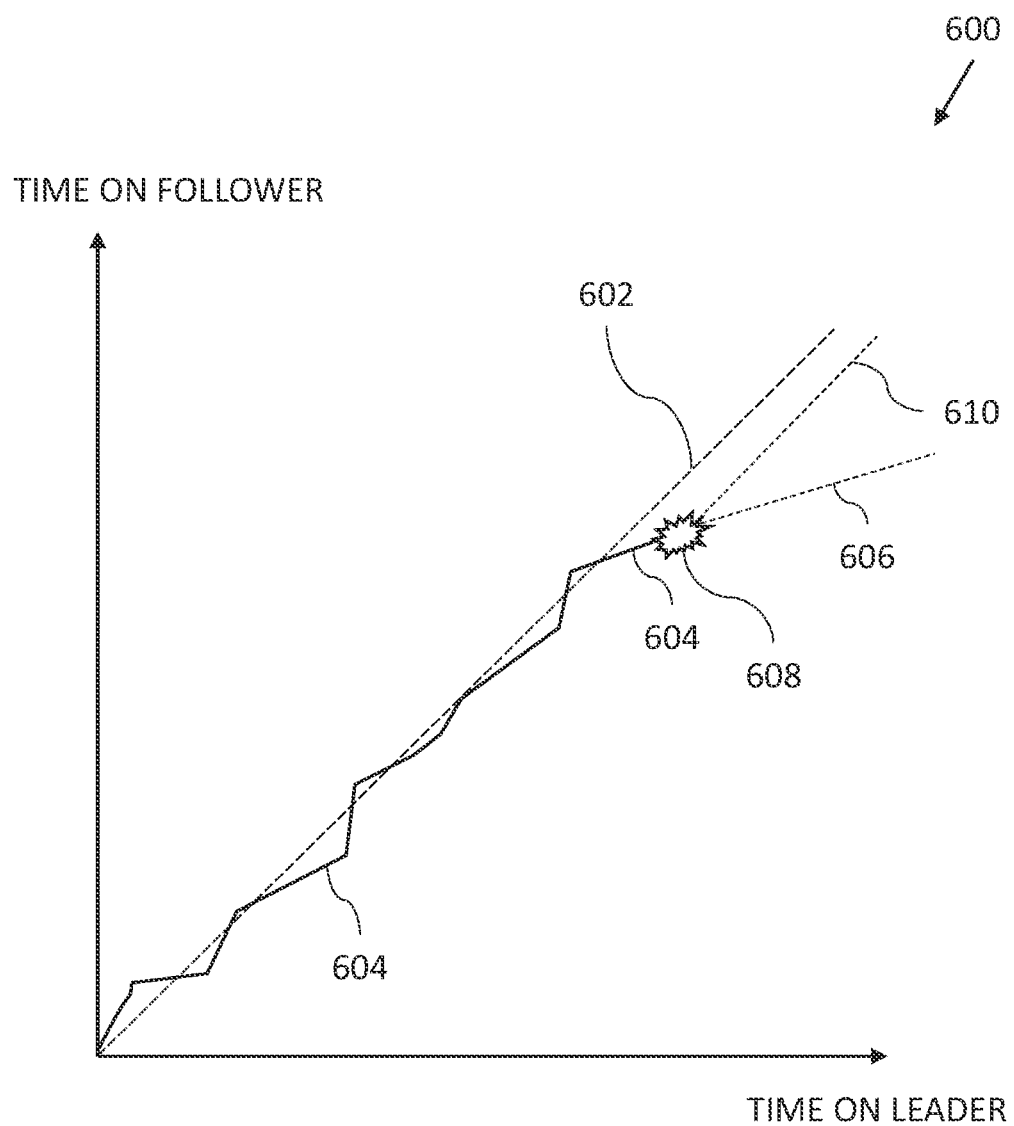
FIG. 6 is a graph illustrating holdover time synchronization in the system of FIG. 1.

Reference is now made to FIG. 6, which is a graph 600 illustrating holdover time synchronization in the system 10 of FIG. 1. The graph 600 shows a line 602 which would be followed if the follower is exactly following the time on the leader all the time (without the need for corrections). A line 604 shows how the follower's time drifts from the time of the leader and is corrected based on the clock (frequency) update commands. At a certain time, the software 18 crashes (icon 608). If the clock controller 22 would continue to maintain the clock based on the latest clock (frequency) update command, the time on the follower would continue to drift from the time of the leader as shown by a line 606 which is a continuation of the last section of the line 604 before the crash. If the clock controller 22 maintains the clock based on the holdover frequency command, the time on the follower (shown by a line 610) does not drift as much as shown by the line 606.

Figure 7:
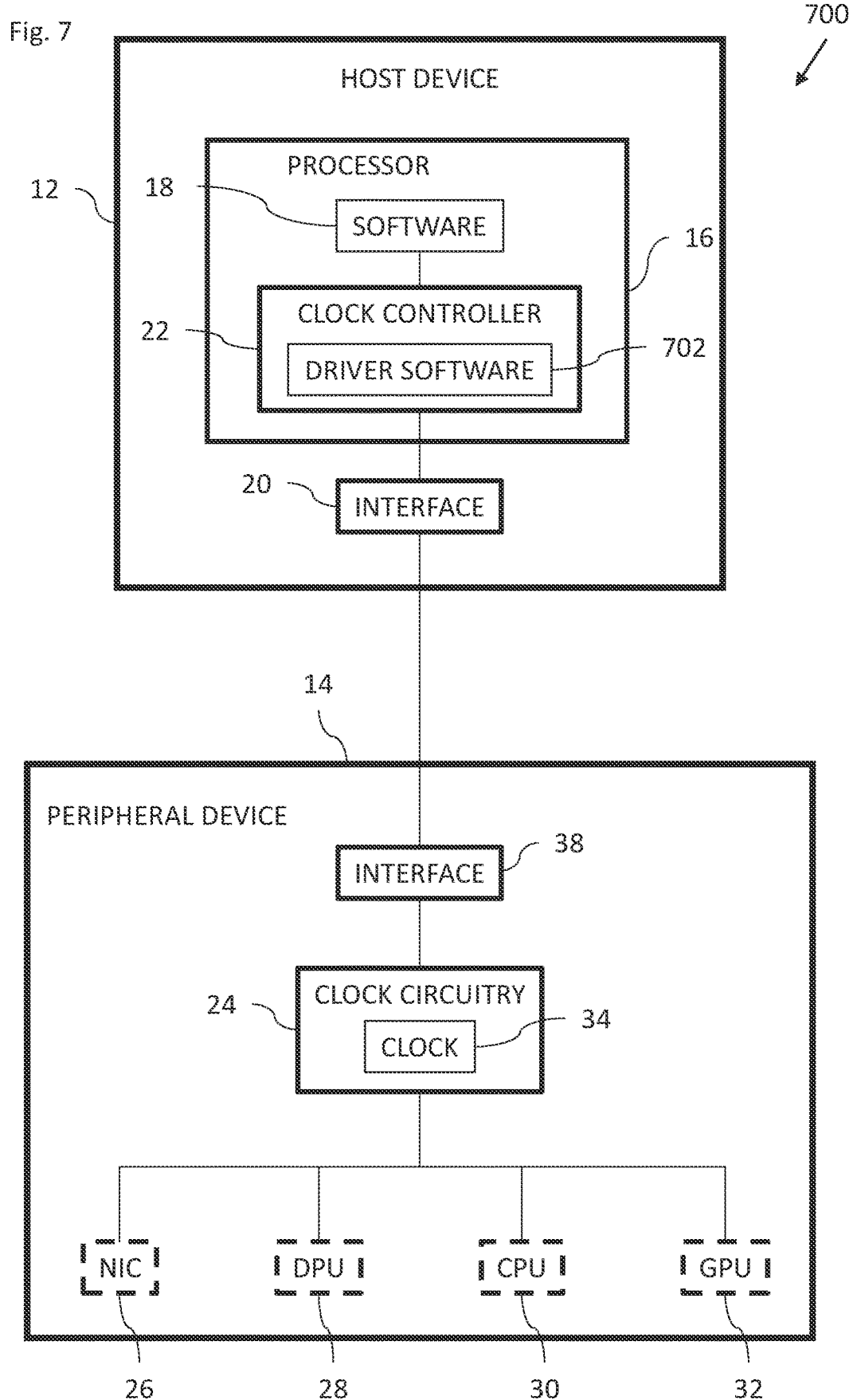
FIG. 7 is a block diagram view of a clock synchronization system constructed and operative in accordance with an alternative embodiment of the present invention.

Reference is now made to FIG. 7, which is a block diagram view of a clock synchronization system 700 constructed and operative in accordance with an alternative embodiment of the present invention. The clock synchronization system 700 is substantially the same as the system 10 of FIG. 1 except for the following differences. The clock controller 22 is comprised in the processor 16 and is typically at least partially implemented by driver software 702 running on the processor 16 of the host device 12. The steps performed by the application specific integrated circuit 36 in the system 10 (as described above with reference to FIGS. 3, 4 and 5) are generally performed by the driver software 702 in the clock synchronization system 700.

In practice, some or all of the functions of the clock controller 22 may be combined in a single physical component or, alternatively, implemented using multiple physical components. These physical components may comprise hard-wired or programmable devices, or a combination of the two. In some embodiments, at least some of the functions of the clock controller 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A clock synchronization system, comprising:
   clock circuitry to maintain a clock running at a clock frequency;
   a clock controller; and
   a processor to execute software to generate clock update commands and provide the clock update commands to the clock controller, wherein the clock controller is configured to:
   apply the clock update commands to the clock;
   store a holdover frequency command to maintain the clock during a failure of the clock update commands;
   apply the holdover frequency command to the clock responsively to detecting the failure, wherein the clock controller or the software is configured to generate the holdover frequency command responsively to any one or more of the following: an average of clock updates; a mean of clock updates; a median of clock updates; and a mode of clock updates; and
   apply the holdover frequency command to the clock in the absence of the clock controller receiving any clock update command within a time period derived from timing criteria.

2. The system according to claim 1, wherein the software is configured to: generate the holdover frequency command; and provide the holdover frequency command to the clock controller.

3. The system according to claim 1, wherein the clock controller is configured to generate the holdover frequency command.

4. The system according to claim 1, wherein the software is configured to:
   generate the timing criteria, which indicates when the controller applies the holdover frequency command; and
   provide the timing criteria to the clock controller.

5. The system according to claim 4, wherein the software is configured to provide a message including the holdover frequency command and the timing criteria to the clock controller.

6. The system according to claim 1, wherein the timing criteria specifies a deadline of the time period.

7. The system according to claim 6, wherein the timing criteria defines the deadline as any of the following: a given time value; a time relative to when the timing criteria was received by the clock controller; a time relative to when the clock controller applied a given previous frequency adjustment; or a time relative to when the clock controller applied a latest frequency adjustment.

8. The system according to claim 1, wherein the software is configured to generate the holdover frequency command responsively to clock updates.

9. The system according to claim 1, wherein the clock controller is configured to generate the holdover frequency command responsively to clock updates.

10. A clock synchronization system, comprising:
    clock circuitry to maintain a clock running at a clock frequency;
    a clock controller; and
    a processor to execute software to generate clock update commands and provide the clock update commands to the clock controller, wherein the clock controller is configured to:
    apply the clock update commands to the clock;
    store a holdover frequency command to maintain the clock during a failure of the clock update commands;
    apply the holdover frequency command to the clock responsively to detecting the failure, wherein the software is configured to: provide a message to the clock controller to cancel the holdover frequency command; and provide another holdover frequency command to the clock controller to override the previously provided holdover frequency command; and apply the holdover frequency command to the clock in the absence of the clock controller receiving any clock update command within a time period derived from timing criteria.

11. The system according to claim 1, wherein the clock controller is comprised in a processor configured to execute driver software, which is configured responsively to detecting the failure to apply the holdover frequency command to the clock.

12. The system according to claim 1, wherein the clock controller includes an application specific integrated circuit, which is configured responsively to detecting the failure to apply the holdover frequency command to the clock.

13. The system according to claim 1, wherein the clock circuitry maintains the clock for at least one of: a network interface controller; a data processing unit (DPU); a central processing unit (CPU); or a graphics processing unit (GPU).

14. A clock synchronization method, comprising:
maintaining a clock running at a clock frequency;
generating clock update commands;
applying by a clock controller the clock update commands to the clock;
storing a holdover frequency command to maintain the clock during a failure of the clock update commands; and
applying by the clock controller the holdover frequency command to the clock responsively to detecting the failure, wherein the generating the holdover frequency command includes generating the holdover frequency command responsively to any one or more of the following: an average of frequency updates; a mean of frequency updates; a median of frequency updates; and a mode of frequency updates, wherein the applying includes applying the holdover frequency command to the clock in the absence of the clock controller receiving any clock update command within a time period derived from timing criteria.

15. The method according to claim 14, further comprising generating the holdover frequency command.

16. The method according to claim 14, further comprising:
generating the timing criteria, which indicates when the clock controller applies the holdover frequency command; and
providing the timing criteria to the clock controller.

17. The method according to claim 16, further comprising providing a message including the holdover frequency command and the timing criteria to the clock controller.

18. The method according to claim 14, wherein the timing criteria specifies a deadline of the time period.

19. The method according to claim 18, wherein the timing criteria defines the deadline as any of the following: a given time value; a time relative to when the timing criteria was received by the clock controller; a time relative to when the clock controller applied a given previous frequency adjustment; or a time relative to when the clock controller applied a latest frequency adjustment.

20. The method according to claim 14, wherein the generating the holdover frequency command includes generating the holdover frequency command responsively to frequency updates.

21. The method according to claim 14, further comprising providing a message to the clock controller to cancel the holdover frequency command.

22. The method according to claim 14, further comprising providing another holdover frequency command to the clock controller to override the previously provided holdover frequency command.

* * * * *